United States Patent
Baba et al.

(10) Patent No.: US 7,191,740 B2
(45) Date of Patent: Mar. 20, 2007

(54) INTERNAL COMBUSTION ENGINE (75) Inventors: Atsushi Baba, Wako (JP); Tsuneo Endoh, Wako (JP); Masashi Shinohara, Wako (JP)

(73) Assignee: Honda Giken Kogyo Kabushiki Kaisha, Tokyo JPX ( * ) Notice: Subject to any disclaimer, the term of this patent is extended or adjusted under 35 U.S.C. 154(b) by 47 days.

(21) Appl. No.: 10/494,054

(22) PCT Filed: Oct. 23, 2002

(86) PCT No.: PCT/JP02/11012

§ 371 (c)(1),
(2), (4) Date: Oct. 29, 2004

(87) PCT Pub. No.: WO03/038250

PCT Pub. Date: May 8, 2003

(65) Prior Publication Data
US 2005/0051114 A1 Mar. 10, 2005

(30) Foreign Application Priority Data
Nov. 2, 2001 (JP) .............................. 2001-337534

(51) Int. Cl.
F02F 1/36 (2006.01)
F02F 1/40 (2006.01)
F02F 1/26 (2006.01)
F28F 13/00 (2006.01)
F01P 3/02 (2006.01)
F01P 3/20 (2006.01)

(52) U.S. Cl. .......................... 123/41.82 R; 123/41.72; 123/41.79; 60/618; 60/320

(58) Field of Classification Search .................. 60/618, 60/320; 123/41.72, 41.79, 41.82 R; F02F 1/40, F02F 1/26, 1/36; F28F 13/00; F01P 3/02, F01P 3/20; F01N 13/00
See application file for complete search history.

(56) References Cited

U.S. PATENT DOCUMENTS 1,033,939 A * 7/1912 Robb et al. ........... 123/41.82 R
1,159,832 A * 11/1915 Daiber et al. ......... 123/41.82 R (Continued)

FOREIGN PATENT DOCUMENTS

JP          58-25551 A      2/1983

(Continued)

*Primary Examiner*—Thai-Ba Trieu
(74) *Attorney, Agent, or Firm*—Birch, Stewart, Kolasch & Birch, LLP (57) ABSTRACT

A cooling block forming a top wall of a combustion chamber of an internal combustion engine is formed by layering, from the outside to the inside, a casing, an upper layer block, a middle layer block, and a lower layer block. Labyrinth-shaped cooling water passages are formed on upper side faces of the three layers of blocks, and cooling water supplied from a cooling water supply passage flows from the cooling water passage on the side far from the combustion chamber to the cooling water passage on the side close to the combustion chamber, and is discharged from a cooling water discharge passage. Since the cooling water flows in a direction opposite to the direction of emission of heat of combustion from the combustion chamber, it is possible to ensure that there is sufficient difference in temperature between a cylinder head and the cooling water throughout the cooling water passages.

26 Claims, 6 Drawing Sheets

U.S. PATENT DOCUMENTS

| | | | | |
|---|---|---|---|---|
| 4,774,912 A | * | 10/1988 | Nakano et al. | 123/41.82 A |
| 4,911,109 A | * | 3/1990 | Kawamura et al. | 123/41.82 R |
| 4,993,227 A | * | 2/1991 | Nagura et al. | 123/41.82 R |
| 5,095,704 A | * | 3/1992 | Nagura et al. | 60/612 |
| 6,279,516 B1 | * | 8/2001 | Haugen et al. | 123/41.82 R |
| 6,681,727 B2 | * | 1/2004 | Krenn | 123/41.82 R |
| 7,069,884 B2 | * | 7/2006 | Baba et al. | 123/41.82 R |

FOREIGN PATENT DOCUMENTS

| | | | | |
|---|---|---|---|---|
| JP | 63-32116 A | | 2/1988 | |
| JP | 01096420 A | * | 4/1989 | 123/41.72 |
| JP | 03033421 A | * | 2/1991 | 123/41.72 |
| JP | 2001-207908 A | | 3/2001 | |
| JP | 2001-183076 A | | 7/2001 | |

* cited by examiner

INTERNAL COMBUSTION ENGINE

FIELD OF THE INVENTION

The present invention relates to an internal combustion engine that includes, within a cylinder head, a cooling water passage above a combustion chamber, the cooling water passage cooling the heat of combustion that is transferred from the combustion chamber to the cylinder head.

BACKGROUND ART

There is known from Japanese Patent Application Laid-open No. 2001-207908 an arrangement in which a cooling water passage is formed in a cylinder head of an internal combustion engine so as to cover an upper part of a combustion chamber. A large amount of cooling water is made to flow through a section of the cooling water passage where there is a large thermal load and a small amount of cooling water is made to flow in a section where there is a small thermal load so that the cylinder head is cooled to the minimum necessary; as a result, the temperature of exhaust gas is maintained as high as possible, thereby promoting warm-up of the internal combustion engine, and giving early activation of an exhaust gas purification catalyst.

In order to recover as much as possible of the waste heat of an internal combustion engine as high temperature steam, it is not sufficient just to make an evaporator provided in an exhaust passage exhibit its full performance by maintaining the exhaust gas at a high temperature; it is also necessary to recover heat that is transferred from the combustion chamber to the cylinder head and dissipated into the air. The heat that is transferred from the combustion chamber to the cylinder head therefore needs to be recovered effectively by water flowing through a cooling water passage formed around the combustion chamber of the cylinder head, thus increasing the temperature of the cooling water as much as possible.

DISCLOSURE OF THE INVENTION

The present invention has been carried out under the above-mentioned circumstances, and an object thereof is to recover as much as possible of the heat that is transferred from a combustion chamber of an internal combustion engine to a cylinder head.

In order to accomplish this object, in accordance with a first aspect of the present invention, there is proposed an internal combustion engine that includes a cylinder head, a combustion chamber, and a cooling water passage for cooling heat of combustion transferred from the combustion chamber to the cylinder head, the cooling water passage being provided within the cylinder head and above the combustion chamber, characterized in that the cooling water passage is formed in multiple layers so as to cover the combustion chamber, and cooling water within the cooling water passage flows from a layer on the side far from the combustion chamber toward a layer on the side close to the combustion chamber so as to oppose the direction of emission of the heat of combustion from the combustion chamber.

In accordance with this arrangement, since the cooling water passage is formed in multiple layers so as to cover the combustion chamber, it is possible to ensure that the overall length of the cooling water passage is sufficiently long, thereby cooling effectively the cylinder head around the combustion chamber. Moreover, since the cooling water flows from a layer on the side far from the combustion chamber toward a layer on the side close to the combustion chamber, that is, the cooling water flows in a direction opposite to the direction of emission of the heat of combustion from the combustion chamber, it is possible to ensure that there is sufficient difference in temperature between the cylinder head and the cooling water throughout the cooling water passage, thereby further improving the effect of the cooling water in cooling the cylinder head. In this way, the surroundings of the combustion chamber of the internal combustion engine, where the temperature is the highest, can be cooled effectively, thus increasing the temperature of the cooling water and thereby improving the efficiency of recovery of waste heat.

Furthermore, in accordance with a second aspect of the present invention, in addition to the first aspect, there is proposed an internal combustion engine wherein cooling water that has passed through the cooling water passage and whose temperature has thereby been increased is used as a heat source for other auxiliary equipment.

In accordance with this arrangement, since the cooling water that has passed through the cooling water passage and whose temperature has thereby been increased is used as the heat source for other auxiliary equipment, waste heat of the internal combustion engine can be utilized effectively without being wastefully disposed of and, furthermore, it is possible to reduce the dimensions of a radiator or eliminate it because of the decrease in temperature of the cooling water.

An expander 12 of an embodiment corresponds to the auxiliary equipment of the present invention.

BRIEF DESCRIPTION OF THE DRAWINGS

FIG. 1 to FIG. 6 illustrate one embodiment of the present invention.

BEST MODE FOR CARRYING OUT THE INVENTION

An embodiment of the present invention is explained below with reference to FIG. 1 to FIG. 6.

Figure 1:
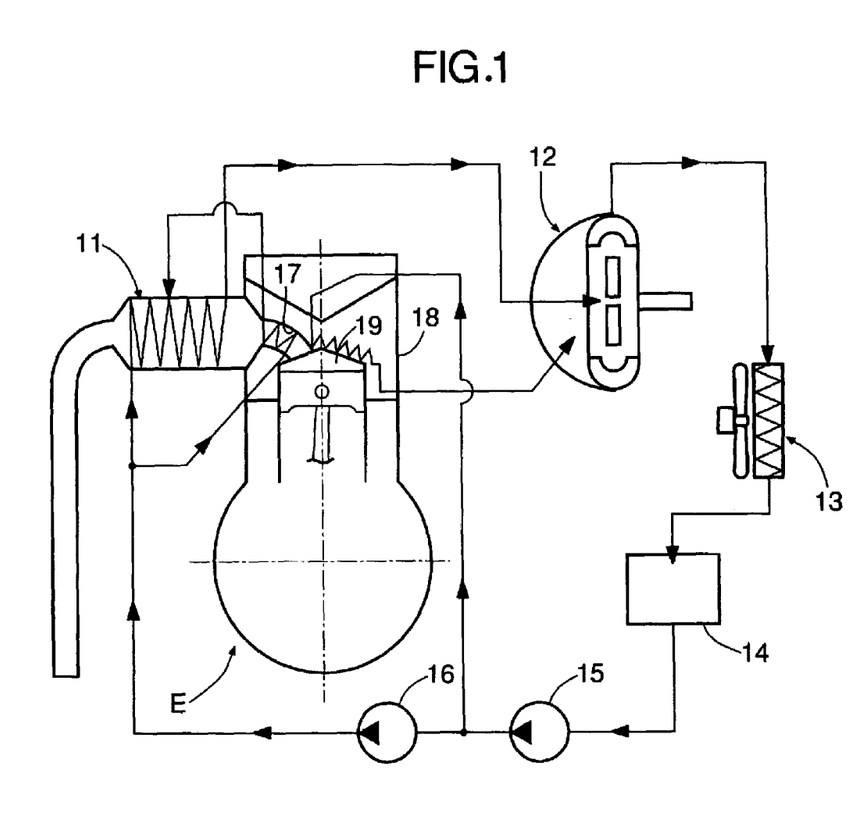
FIG. 1 is a diagram showing the overall arrangement of a Rankine cycle system.

FIG. 1 shows the overall arrangement of a Rankine cycle system to which the present invention is applied.

The Rankine cycle system, which recovers the thermal energy of exhaust gas of an internal combustion engine E and converts it into mechanical energy, includes a first evaporator 11 that heats water using the exhaust gas discharged from the internal combustion engine E so as to generate high temperature, high-pressure steam, an expander 12 that is operated by the high temperature, high-pressure steam generated by the first evaporator 11 so as to generate mechanical energy, a condenser 13 that cools decreased temperature, decreased pressure steam that has completed work in the expander 12 so as to turn it back into water, a reservoir tank 14 for collecting water discharged from the condenser 13, a low-pressure pump 15 for pressurizing the water collected in the reservoir tank 14, and a high-pressure pump 16 for further pressurizing the water that has been pressurized by the low-pressure pump 15. The greater part of the water discharged from the high-pressure pump 16 is supplied to the first evaporator 11, which is provided downstream of an exhaust port 17 of the internal combustion engine E, turns into high temperature, high-pressure steam in the first evaporator 11, and is supplied to the expander 12. A part of the water discharged from the high-pressure pump 16 is heated by passing through a second evaporator provided in an outer peripheral portion of the exhaust port 17, and is then recombined with the rest of the water at a predetermined position within the first evaporator 11. Water discharged from the low-pressure pump 15 is supplied to a cylinder head 18 of the internal combustion engine E, and is heated by carrying out heat exchange with the heat that is transferred from the combustion chamber 19 to the cylinder head 18. This heated water has its temperature and pressure made to match appropriately the high temperature, high-pressure steam supplied from the first evaporator 11 and is combined therewith in the expander 12 so as to become steam, thus contributing to an improvement of the output of the expander 12.

Cooling of the cylinder head 18 by the water supplied from the low-pressure pump 15 is now explained.

As shown in FIG. 2 to FIG. 5, the cylinder head 18 and a head cover 22 are joined to a cylinder block 21 of the internal combustion engine E, and a combustion chamber 19 is formed between a lower face of the cylinder head 18 and an upper face of a piston 24 that is slidably fitted in a cylinder sleeve 23 housed in the cylinder block 21. Formed in the cylinder head 18 are two intake ports 25 and one exhaust port 17, which communicate with the combustion chamber 19. An intake valve opening 27 at the downstream end of the intake port 25 is opened and closed by an intake valve 28, and an exhaust valve opening 29 at the upstream end of the exhaust port 17 is opened and closed by an exhaust valve 30. The intake ports 25 are formed directly in the cylinder head 18, but the exhaust port 17 is formed from a member that is separate from the cylinder head 18, and is fitted in the cylinder head 18.

The cylinder head 18 supports a single camshaft 31, an intake rocker arm shaft 32, and an exhaust rocker arm shaft 33. One end of an intake rocker arm 34 rockably supported by the intake rocker arm shaft 32 abuts against an intake cam 35 provided on the camshaft 31, and the other end thereof abuts against a stem end of the intake valve 28, the intake valve 28 being slidably supported by a valve guide 36 provided in the cylinder head 18 and urged upward by a valve spring 37. One end of an exhaust rocker arm 38 rockably supported by the exhaust rocker arm shaft 33 abuts against an exhaust cam 39 provided on the camshaft 31, and the other end thereof abuts against a stem end of the exhaust valve 30, the exhaust valve 30 being slidably supported by a valve guide 40 provided in the cylinder head 18 and urged upward by a valve spring 41.

A spark plug 43 having a lower end thereof facing the combustion chamber 19 is provided within each of two guide tubes 42 provided in the cylinder head 18. The outer side of the exhaust port 17 of the cylinder head 18 has its diameter enlarged in a trumpet shape, and a part of the first evaporator 11 is fitted therein and fixed.

A cooling block 51 forming the top wall of the combustion chamber 19 is a body have layers that have an overall shape that is substantially similar to the surface of the wall of the combustion chamber 19, and is fixed so as to fit into a lower face of the cylinder head 18. The cooling block 51 is formed by layering four members in the vertical direction, that is, a casing 52 on the outermost side, an upper layer block 53 below the casing 52, a middle layer block 54 below the upper layer block 53, and a lower layer block 55 below the middle layer block 54. The top wall of the combustion chamber 19, the intake valve opening 27, and the exhaust valve opening 29 are formed on a lower face of the lower layer block 55.

Figure 3:
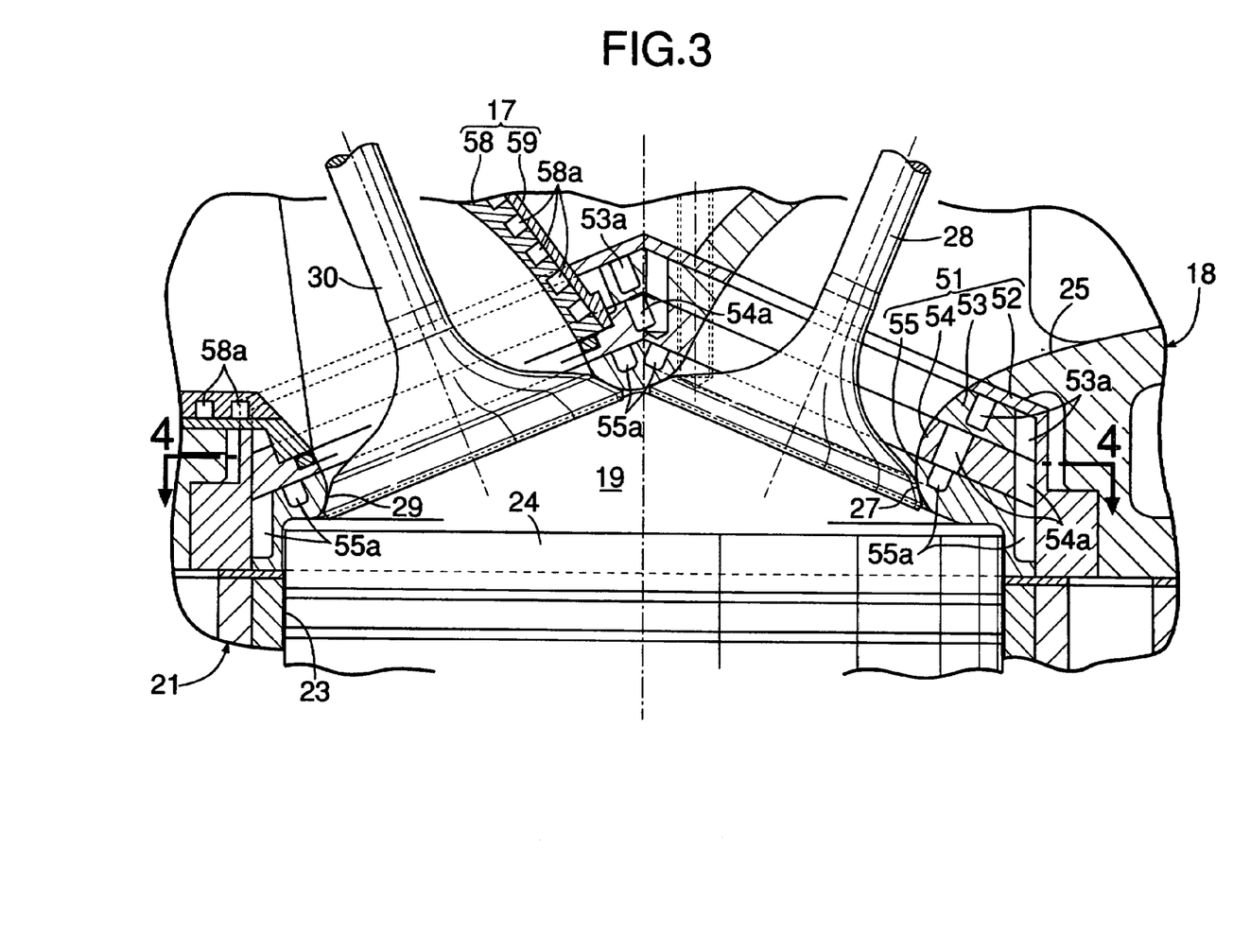
FIG. 3 is an enlarged view of part 3 in FIG. 2 (sectional view along line 3—3 in FIG. 4)
Figure 4:
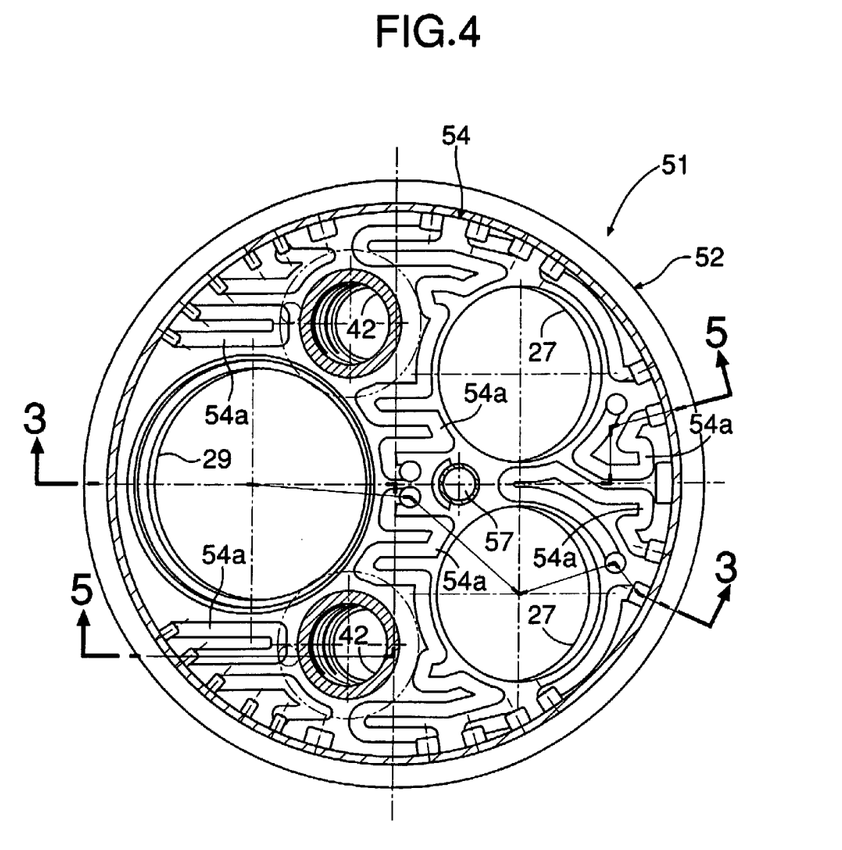
FIG. 4 is a sectional view along line 4—4 in FIG. 3.
Figure 5:
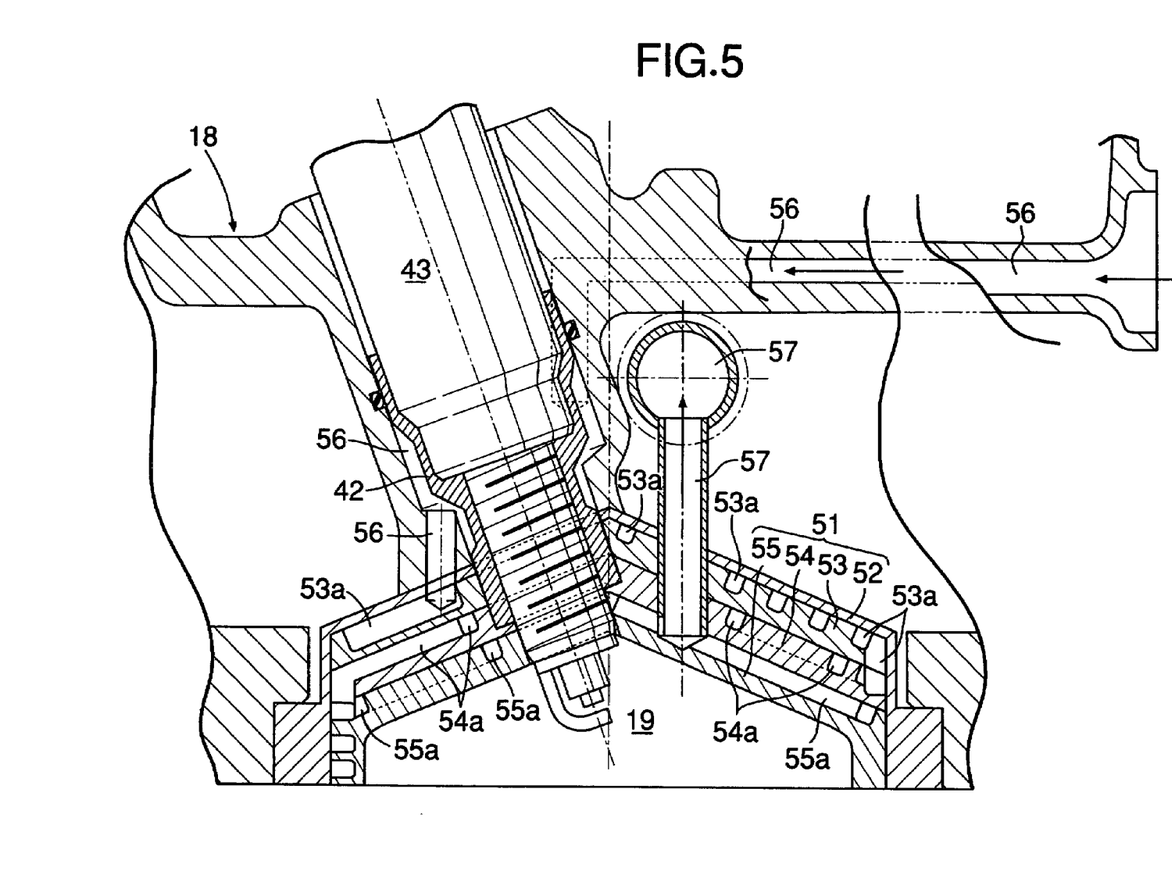
FIG. 5 is a sectional view along line 5—5 in FIG. 4.

Labyrinth-shaped channels are formed on upper faces and side faces of the upper layer block 53, the middle layer block 54, and the lower layer block 55. The channel of the upper layer block 53 forms a labyrinth-shaped cooling water passage 53a between itself and an inner face of the casing 52, the channel of the middle layer block 54 forms a cooling water passage 54a between itself and a lower face of the upper layer block 53 and between itself and the inner face of the casing 52, and the channel of the lower layer block 55 forms a cooling water passage 55a between itself and a lower face of the middle layer block 54 and between itself and the inner face of the casing 52. Formed in the cylinder head 18 are a cooling water supply passage 56 and a cooling water discharge passage 57. The cooling water supply passage 56 passes around the guide tube 42 of the spark plug 43, which attains a high temperature, and communicates with the cooling water passage 53a of the upper layer block 53, and the cooling water discharge passage 57 communicates with the cooling water passage 55a of the lower layer block 55.

Figure 6:
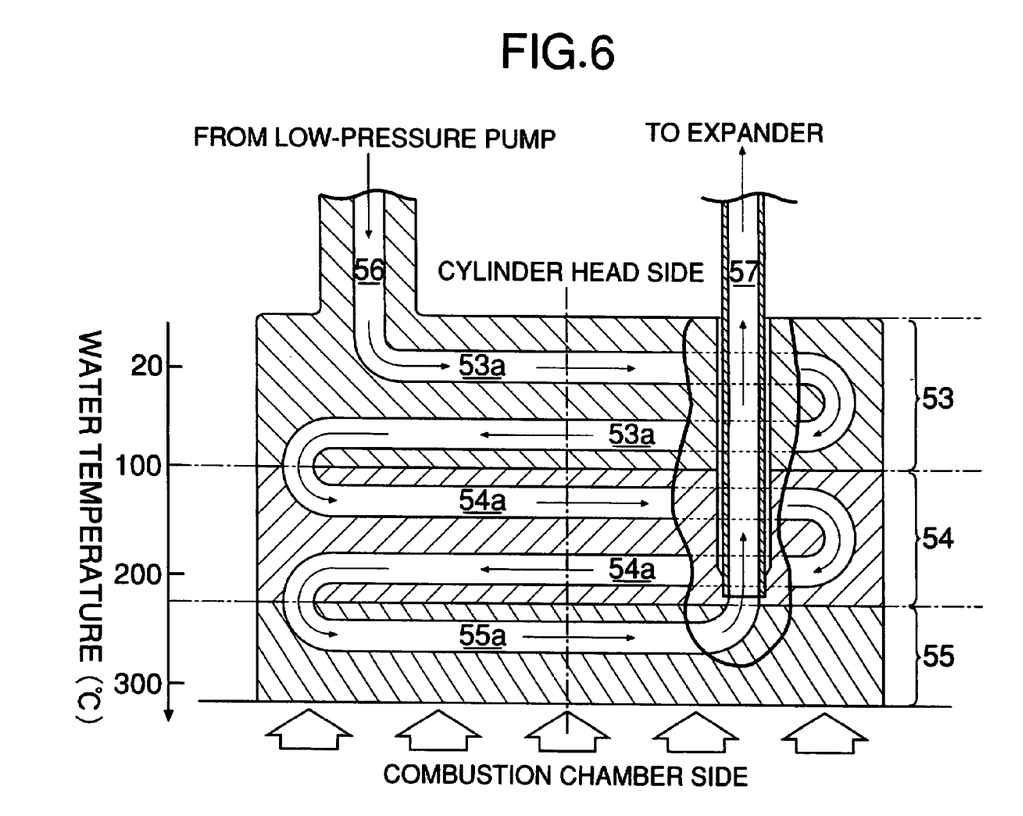
FIG. 6 is a schematic view showing the direction of flow of cooling water in a cooling block.

As shown schematically in FIG. 6, the cooling water passage 53a of the upper layer block 53, the cooling water passage 54a of the middle layer block 54, and the cooling water passage 55a of the lower layer block 55 of the cooling block 51 are all connected together in line. Low temperature water from the low-pressure pump 15 is supplied to the upstream end of the cooling water passage 53a of the upper layer block 53 via the cooling water supply passage 56, and high temperature water from the downstream end of the cooling water passage 55a of the lower layer block 55 is supplied to the expander 12 via the cooling water discharge passage 57. That is, the low temperature water from the low-pressure pump 15 passes through the cooling water passage 53a of the upper layer block 53, where the temperature is relatively low since it is the farthest from the combustion chamber 19, then passes through the cooling water passage 54a of the middle layer block 54, where the temperature is medium since it is a medium distance from the combustion chamber 19, and finally passes through the cooling water passage 55a of the lower layer block 55, where the temperature is relatively high since it is the closest to the combustion chamber 19.

In this way, since the labyrinth-shaped cooling water passages 53a, 54a, and 55a are formed so as to have a long overall length by superimposing three layers, that is, the upper layer block 53, the middle layer block 54, and the lower layer block 55, the cooling effect can be improved by carrying out heat exchange sufficiently with the cylinder head 18 around the combustion chamber 19, where the temperature becomes high. Moreover, since the cooling water is made to flow in a direction opposite to the temperature gradient of the cylinder head 18 in which the farther from the combustion chamber 19, the lower the temperature, that is, since the cooling water is made to flow from a position far from the combustion chamber 19 toward a position closer thereto, it is possible to maximize the heat exchange efficiency by ensuring that the difference in temperature between the cylinder head 18 and the cooling water is sufficient throughout the cooling water passages 53a, 54a, and 55a, and it is possible to heat the cooling water effectively while cooling the cylinder head 18 effectively, thereby contributing as much as possible to an improvement in the output of the expander 12. Furthermore, since the cylinder head 18 can be cooled sufficiently by cooling water flowing within the cooling block 51, the load imposed on a cooling system for circulating cooling water through an ordinary water jacket and radiator can be lessened, and the dimensions of the radiator can be reduced.

Figure 2:
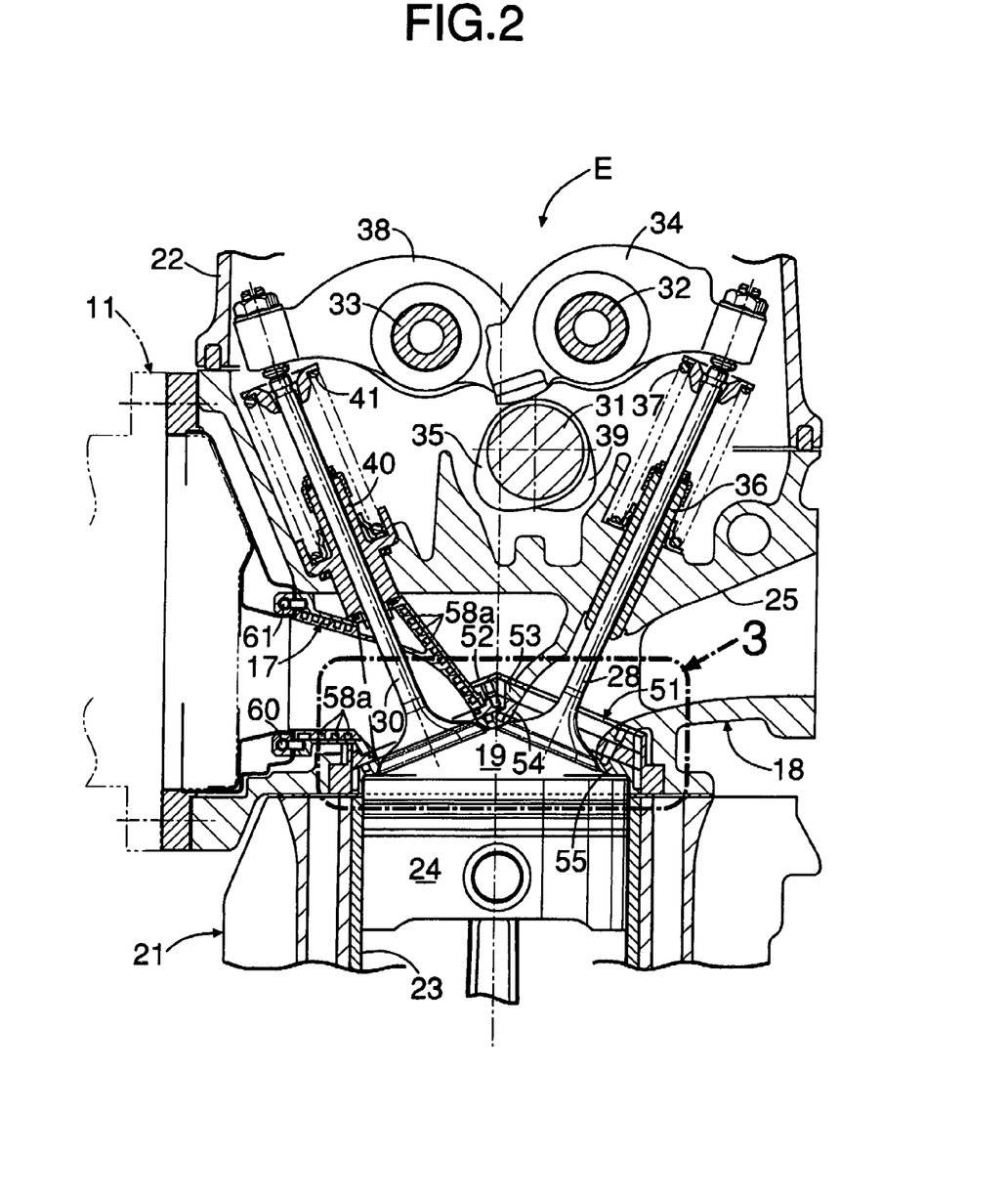
FIG. 2 is a vertical sectional view of the surroundings of a cylinder head of an internal combustion engine.

As is clear from FIG. 2 and FIG. 5, the exhaust port 17, which is a separate member from the cylinder head 18, is formed from an inner-side exhaust port main body 58, which is a thick member, and a thin cover 59 covering the outside of the exhaust port main body 58, and a cooling water passage 58a is formed between the cover 59 and a labyrinth-shaped channel formed on the surface of the exhaust port main body 58. The cooling water passage 58a includes a cooling water inlet 60 and a cooling water outlet 61, and a part of the water discharged from the high-pressure pump 16 flows from the cooling water inlet 60 into the cooling water passage 58a of the exhaust port 17, cools the exhaust port 17, where the thermal load is the greatest, and is then supplied from the cooling water outlet 61 to an intermediate section of the first evaporator 11.

In this way, supplying to the intermediate section of the first evaporator 11 cooling water that has recovered effectively the waste heat of the exhaust gas passing through the exhaust port 17 enables the performance of the first evaporator 11 to be further improved, thereby making the expander 12 exhibit its maximum output.

Although an embodiment of the present invention is explained in detail above, the present invention can be modified in a variety of ways without departing from the spirit and scope of the present invention For example, in the embodiment, the cooling block 51 is formed from three layers, that is, the upper layer block 53, the middle layer block 54, and the lower layer block 55, but it can be formed from two layers or four or more layers.

Furthermore, in the embodiment, heated cooling water is supplied to the expander 12 of the Rankine cycle system, but it is also possible for it to be used as a heat source for other auxiliary equipment, such as a thermoelectric element.

INDUSTRIAL APPLICABILITY

The present invention can be applied desirably to an internal combustion engine that includes a Rankine cycle system, but the present invention can also be applied to any type of internal combustion engine where waste heat is recovered and utilized.

The invention claimed is:

1. An internal combustion engine comprising:
   a cylinder head;
   a combustion chamber having a top wall of a non-planar shape; and
   a cooling water passage for cooling heat of combustion transferred from the combustion chamber to the cylinder head, the cooling water passage being provided within the cylinder head and above the combustion chamber;
   wherein the cooling water passage is formed in multiple layers so as to cover the combustion chamber, and cooling water within the cooling water passage flows from a layer on the side far from the combustion chamber toward a layer on the side close to the combustion chamber so as to oppose the direction of emission of the heat of combustion from the combustion chamber; and
   wherein the multiple layers forming the cooling water passage are each shaped to correspond to a shape of the non-planar top wall of the combustion chamber.

2. The internal combustion engine according to claim 1, wherein cooling water that has passed through the cooling water passage and whose temperature has thereby been increased is used as a heat source for other auxiliary equipment.

3. The internal combustion engine according to claim 1, wherein each of the multiple layers forming the cooling water passage is formed of a substantially conical shape.

4. An internal combustion engine comprising:
   a cylinder head;
   a combustion chamber; and
   a cooling water passage for cooling heat of combustion transferred from the combustion chamber to the cylinder head, the cooling water passage being provided within the cylinder head and above the combustion chamber;
   wherein the cooling water passage is formed in multiple layers so as to cover the combustion chamber, and cooling water within the cooling water passage flows from a layer on the side far from the combustion chamber toward a layer on the side close to the combustion chamber so as to oppose the direction of emission of the heat of combustion from the combustion chamber; and
   wherein the multiple layers forming the cooling water passage are defined in a plurality of separate members which are layered one on another.

5. The internal combustion engine according to claim 4, wherein cooling water that has passed through the cooling water passage and whose temperature has thereby been increased is used as a heat source for other auxiliary equipment.

6. The internal combustion engine according to claim 4, wherein the separate members layered one on another are fixed so as to fit into a lower face of the cylinder head.

7. An internal combustion engine comprising:
   a cylinder head;
   a combustion chamber; and
   a cooling water passage for cooling heat of combustion transferred from the combustion chamber to the cylinder head, the cooling water passage being provided within a cooling block fixed so as to fit into a lower face of the cylinder head and above the combustion chamber;
   wherein the cooling water passage is formed in multiple layers so as to cover the combustion chamber, and cooling water within the cooling water passage flows from a layer on the side far from the combustion chamber toward a layer on the side close to the combustion chamber so as to oppose the direction of emission of the heat of combustion from the combustion chamber.

8. The internal combustion engine according to claim 7, wherein cooling water that has passed through the cooling water passage and whose temperature has thereby been increased is used as a heat source for other auxiliary equipment.

9. The internal combustion engine according to claim 7, wherein the cooling block is coaxially disposed above the combustion chamber.

10. The internal combustion engine according to claim 7, wherein the cooling block is formed by layering four members in the vertical direction, the four layers including a casing on an outermost side, an upper layer block below the casing, a middle layer block below the upper layer block, and a lower layer block below the middle layer block.

11. The internal combustion engine according to claim 10, wherein a top wall of the combustion chamber, an intake valve opening, and the exhaust valve opening are formed on a lower face of the lower layer block.

12. The internal combustion engine according to claim 7, further comprising a discharge passage formed in the cooling block in a position that is equidistant from each of two sparkplug guide holes, the discharge passage extending parallel to an axis of the combustion chamber.

13. An internal combustion engine comprising:
a cylinder head;
a combustion chamber;
a cooling block forming a top wall of the combustion chamber and having an overall shape that corresponds to that of a cylinder sleeve defining of the combustion chamber; and
a cooling water passage for cooling heat of combustion transferred from the combustion chamber to the cylinder head, the cooling water passage being provided within the cooling block above the combustion chamber;
wherein the cooling water passage is formed in multiple layers so as to cover the combustion chamber, and cooling water within the cooling water passage flows from a layer on the side far from the combustion chamber toward a layer on the side close to the combustion chamber so as to oppose the direction of emission of the heat of combustion from the combustion chamber.

14. The internal combustion engine according to claim 13, wherein cooling water that has passed through the cooling water passage and whose temperature has thereby been increased is used as a heat source for other auxiliary equipment.

15. The internal combustion engine according to claim 13, wherein the cooling block is coaxially disposed above the combustion chamber.

16. The internal combustion engine according to claim 13, wherein the cooling block is formed by layering four members in the vertical direction, the four layers including a casing on an outermost side, an upper layer block below the casing, a middle layer block below the upper layer block, and a lower layer block below the middle layer block.

17. The internal combustion engine according to claim 11, claim 16, wherein a top wall of the combustion chamber, an intake valve opening, and the exhaust valve opening are formed on a lower face of the lower layer block.

18. The internal combustion engine according to claim 13, further comprising a discharge passage formed in the cooling block in a position that is equidistant from each of two sparkplug guide holes, the discharge passage extending parallel to an axis of the combustion chamber.

19. An internal combustion engine comprising:
a cylinder head;
a combustion chamber;
a cooling block having multiple layers forming a top wall of the combustion chamber and having an overall shape that is substantially the same as a surface of a wall of the combustion chamber; and
a labyrinth-shaped cooling water passage for cooling heat of combustion transferred from the combustion chamber to the cylinder head, the cooling water passage being provided within the cooling block above the combustion chamber;
wherein the labyrinth-shaped cooling water passage is formed in upper faces of the multiple layers of the cooling block so as to cover the combustion chamber, and cooling water within the cooling water passage flows from a layer on the side far from the combustion chamber toward a layer on the side close to the combustion chamber so as to oppose the direction of emission of the heat of combustion from the combustion chamber.

20. The internal combustion engine according to claim 19, wherein cooling water that has passed through the cooling water passage and whose temperature has thereby been increased is used as a heat source for an expander.

21. The internal combustion engine according to claim 19, wherein the cooling block is coaxially disposed above the combustion chamber.

22. The internal combustion engine according to claim 19 wherein the cooling block is formed by layering four members in the vertical direction, the four layers including a casing on an outermost side, an upper layer block below the casing, a middle layer block below the upper layer block, and a lower layer block below the middle layer block.

23. The internal combustion engine according to claim 22, wherein a top wall of the combustion chamber, an intake valve opening, and the exhaust valve opening are formed on a lower face of the lower layer block.

24. The internal combustion engine according to claim 19, further comprising two sparkplug guide holes, the discharge passage extending parallel to an axis of the combustion chamber.

25. An internal combustion engine comprising:
a cylinder head;
a combustion chamber; and
a cooling water passage for cooling heat of combustion transferred from the combustion chamber to the cylinder head, the cooling water passage being provided within the cylinder head and above the combustion chamber;
wherein the cooling water passage is formed in multiple layers so as to cover the combustion chamber, and cooling water within the cooling water passage flows from a layer on the side far from the combustion chamber toward a layer on the side close to the combustion chamber so as to oppose the direction of emission of the heat of combustion from the combustion chamber; and
wherein the cooling water passage has an inlet connected to said layer on the side far from the combustion chamber and an outlet connected to said layer close to the combustion chamber, said outlet being formed so as to be open at a position outwardly of said layer far from the combustion chamber.

26. The internal combustion engine according to claim 25, wherein cooling water that has passed through the cooling water passage and whose temperature has thereby been increased is used as a heat source for other auxiliary equipment.

* * * * *